United States Patent [19]

Hirai et al.

[11] Patent Number: 4,614,728

[45] Date of Patent: Sep. 30, 1986

[54] CATALYST COMPOSITION FOR PRODUCING ETHYLENE GLYCOL AND PROCESS FOR PRODUCING THE CATALYST COMPOSITION

[75] Inventors: Koichi Hirai; Taizo Uda; Yasuo Nakamura, all of Ube, Japan

[73] Assignee: Ube Industries, Ltd., Yamaguchi, Japan

[21] Appl. No.: 694,973

[22] Filed: Jan. 25, 1985

[30] Foreign Application Priority Data

Jan. 27, 1984 [JP] Japan ................................ 59-12009
Feb. 3, 1984 [JP] Japan ................................ 59-17161

[51] Int. Cl.⁴ .......................... B01J 21/08; B01J 23/72
[52] U.S. Cl. ..................................... 502/244; 568/864
[58] Field of Search ....................... 502/244; 568/864

[56] References Cited

U.S. PATENT DOCUMENTS 4,112,245 9/1978 Zehner et al. ................ 568/864
4,440,873 4/1984 Miyazaki et al. .............. 502/244

FOREIGN PATENT DOCUMENTS 2121310 12/1983 United Kingdom ............ 502/244

Primary Examiner—W. J. Shine
Attorney, Agent, or Firm—Sherman and Shalloway

[57] ABSTRACT

A hydrogenation catalyst composition composed of a reduction product of a copper-containing material formed by contacting an aqueous solution of an amine/copper complex with a carrier, characterized in that the carrier is a hydrolyzed product obtained by hydrolyzing a silicate ester in the presence of ammonia; a process for producing the aforesaid hydrogenation catalyst composition; and a process for producing ethylene glycol or a glycolate ester in the presence of the aforesaid hydrogenation catalyst.

16 Claims, No Drawings

CATALYST COMPOSITION FOR PRODUCING ETHYLENE GLYCOL AND PROCESS FOR PRODUCING THE CATALYST COMPOSITION

This invention relates to a commercial process for producing ethylene glycol from an oxalate diester or a glycolate ester efficiently over an extended period of time in high conversions and selectivities without causing pollution attributed to the use of a chromium-containing catalyst composition. The invention also relates to a catalyst composition for use in the aforesaid process, and to a process for producing the catalyst composition.

More specifically, this invention relates to a hydrogenation catalyst composition for use in the hydrogenation of an oxalate diester or a glycolate ester composed of a reduction product of a copper-containing material formed by contacting an aqueous solution of an ammine/copper complex with a carrier; characterized in that the carrier is a hydrolyzed product obtained by hydrolyzing a silicate ester in the presence of ammonia.

This invention also pertains to a process for producing the aforesaid catalyst composition, and also to a process for producing ethylene glycol which comprises subjecting an oxalate diester or a glycolate ester to vapor-phase (or gaseous phase) catalytic hydrogenation in the presence of the catalyst composition.

It is known to prepare ethylene glycol and/or a glycolate ester by the catalytic hydrogenation of an oxalate diester in the gaseous or vapor phase at an elevated temperature in the presence of a hydrogenation catalyst, and a Cu/Cr type catalyst has already been proposed as the hydrogenation catalyst (see Japanese Patent Publication No. 42971/1980 corresponding to U.S. Pat. No. 4,112,245; and German Pat. No. 459,603).

Cu/Cr type catalysts are generally known as catalysts which can be utilized to hydrogenate esters to the corresponding alcohols. In practice, however, the use of this type of Cr-containing catalysts causes troubles. It is extremely difficult, if not impossible by a complicated and expensive operation, to recover chromium efficiently and completely from a spent Cu/Cr type catalyst, and such a catalyst is not suitable for industrial operations. Since chromium, even in trace, exhibits strong toxicity to humans, discarding of chromium-containing catalyst residues in general environments should be avoided. This leads to the defect that the high catalytic activity of the Cu/Cr type catalysts is reduced in practice because of the difficulty of disposing of the spent catalysts.

It is generally known that various other metals or metal compounds can be used as hydrogenation catalysts or their components. Examples include Raney nickel, nickel, cobalt, copper, iron, platinum, and palladium, and their oxides and sulfides. It is well known that these generally known metals or metal compounds are not necessarily useful in any catalytic hydrogenation reactions, and a desired hydrogenation reaction cannot be carried out efficiently unless a catalyst suitable for the desired hydrogenation is selected according to the mode of the reaction, the hydrogenation reaction conditions, etc. It is also widely known that no established guideline exists for selecting such a suitable catalyst.

Some prior proposals are known in regard to a process for producing ethylene glycol by the vapor-phase catalytic hydrogenation of an oxalate diester or a glycolate ester in high conversions and selectivities while avoiding the technical troubles associated with the use of Cr-containing catalysts, a Cr-free hydrogenation catalyst composition suitable for use in the above process comprising a reduction product of a copper-containing material formed by contacting an aqueous solution of an ammine/copper complex with a carrier, and a process for producing the catalyst composition.

For example, European Laid-Open Patent Publication No. 0064241 laid-open on Nov. 10, 1982 proposes a hydrogenation catalyst composition useful for the hydrogenation of an oxalate diester composed of a reduction product of copper-containing silica gel formed by contacting an ammine/copper complex with colloidal silica sol, a process for the production of the aforesaid catalyst composition, and a process for producing ethylene glycol using the catalyst composition.

British Patent Application No. 2121310A laid-open on Dec. 21, 1983 proposes a hydrogenation catalyst composition for use in the hydrogenation of a lower alkyl ester of a lower hydroxycarboxylic acid, which is composed of a reduction product of copper-containing silica gel formed by contacting an ammine/copper complex with silica gel having an average particle diameter of not more than 200 microns or colloidal silica sol, a process for producing the catalyst composition, and a process for producing a lower alkylene glycol using the catalyst composition.

European Laid-Open Patent Publication No. 0097262 laid-open on Jan. 4, 1984 proposes a hydrogenation catalyst composition for use in the hydrogenation of an oxalate diester which comprises reduction product of copper-containing silica gel formed by contacting an ammine/copper complex with silica gel having an average particle diameter of not more than 200 microns, a process for producing the catalyst composition, and a process for producing ethylene glycol using the catalyst composition.

These patent documents, however, neither describe nor suggest a hydrogenation catalyst composition composed of a reduction product of a copper-containing material formed by contacting an aqueous solution of an ammine/copper complex with a carrier, in which the carrier is a hydrolyzed product obtained by hydrolyzing a silicate ester in the presence of ammonia.

It is well known on the other hand that asymmetrical diols, especially 1,2-butanediol, which may be contained as impurities in ethylene glycol extensively used as a raw material for fiber-forming polyesters are highly undesirable, and their presence is to be avoided.

For example, European Laid-Open Patent Publication No. 0060787 proposes the preparation of ethylene glycol by the vapor-phase hydrogenation of oxalate esters. It states that the amount of the undesirable by-product 1,2-butanediol can be controlled to 1% by weight or less by employing very strictly and carefully controlled conditions including temperature, pressure, space velocity, liquid hourly space velocity and the mole ratio of hydrogen to dialkyl oxalate. The need for such complex and strict controlling of the reaction conditions is disadvantageous in commercial practice. In addition, this patent document recommends the use of a Cu- and Cr-containing catalyst such as copper zinc chromite, copper chromite and copper barium chromite as the solid copper-containing hydrogenation catalyst. As stated hereinabove, this brings about the disadvantage that the technical troubles associated with the use of the Cr-containing catalyst cannot be avoided.

This European patent document states that it is difficult for the prior art to provide fiber-grade ethylene glycol, and when an oxalate diester is hydrogenated by using ordinary copper-containing catalysts, large amounts of by-product asymmetrical diols, especially 1,2-butanediol, are formed as impurities. Since the boiling point of 1,2-butanediol is close to that of ethylene glycol, their separation is difficult. It is well known that when polyester fibers (the main use of ethylene glycol) are produced by using the 1,2-butanediol-containing ethylene glycol, the general properties, such as dyeability, tenacity and color, of the polyester fibers are deteriorated, as shown also in this patent document. The formation of by-product 1,2-butanediol tends to increase as the degree of reaction of the oxalate diester to a glycolate ester and further to ethylene glycol increases.

The present inventors made investigations in order to develop a process which can give fiber-grade ethylene glycol in high conversions and selectivities by the vapor-phase catalytic hydrogenation of an oxalate diester or a glycolate ester by an industrially easy operation while advantageously inhibiting the formation of by-product 1,2-butanediol and circumventing the troubles attributed to the use of a Cr-containing catalyst, a catalyst composition suitable for use in the aforesaid process, and a process for producing the catalyst composition.

These investigations have led to the discovery that in a hydrogenation catalyst composition for use in the hydrogenation of an oxalate diester or a glycolate ester composed of a reduction product of a copper-containing material formed by contacting an aqueous solution of an ammine/copper complex with a carrier, the selection of the carrier is an important factor for the properties of the resulting hydrogenation catalyst composition, especially the property of giving high conversion and selectivity and markedly inhibiting the formation of the undesirable by-product 1,2-butanediol.

Specifically, the investigations of the present inventors have shown that the selection of a hydrolyzed product obtained by hydrolyzing a silicate ester in the presence of ammonia as the carrier in the aforesaid hydrogenation catalyst composition can lead to the achievement of various improvements which are difficult to attain by the prior art techniques discussed hereinabove.

The investigations of the present inventors have shown that by using this catalyst composition, fiber-grade ethylene glycol can be produced in high conversions and selectivities while markedly reducing the amount of by-product 1,2-butanediol or substantially avoiding its formation; fiber-grade ethylene glycol can be advantageously produced on a commercial scale while avoiding the toxicity or pollution trouble attributed to the use of a Cr-containing catalyst composition and without the disadvantage of requiring the complex and strict control of the reaction conditions; and that chemical and physical efficiencies can be kept high for an extended period of time, and the excellent catalytic performance can be maintained stably over an extended period of time.

It is an object of this invention therefore to provide a hydrogenation catalyst composition for the hydrogenation of an oxalate diester.

A second object of this invention is to provide a process for producing the aforesaid hydrogenation catalyst.

A third object of this invention is to provide a process for producing ethylene glycol or a glycolate ester from an oxalate diester in the presence of the aforesaid hydrogenation catalyst.

The above and other objects and advantages of this invention will become more apparent from the following description.

The hydrogenation catalyst composition of this invention can be produced by a process which comprises contacting an aqueous solution of an ammine/copper complex with a hydrolyzed product obtained by hydrolyzing a silicate ester in the presence of ammonia, and subjecting the resulting copper-containing hydrolyzed product to a reducing treatment.

The aqueous solution containing an ammine complex of copper can be prepared by a method known per se. For example, it can be prepared by adding ammonia to an aqueous solution containing a copper ion until the solution becomes alkaline. It can also be prepared by adding copper flakes to a concentrated aqueous solution of ammonia and passing air through the mixture.

The aqueous solution containing a copper ion can be obtained by dissolving a water-soluble copper compound (including copper salts) in water. Examples of such copper compounds are copper nitrate, copper hydroxide, copper sulfate, copper oxalate, copper chloride, copper carbonate, and copper acetate. Cupric nitrate or cupric hydroxide is especially preferred.

The hydrolyzed product used as a carrier to be contacted with the aqueous solution of an ammine/copper comple is obtained by hydrolyzing a silicate ester in the presence of ammonia. It is generally known of course that the hydrolyis of the silicate ester can be carried out under acidic or alkaline conditions. In the present invention, the use of the hydrolyzed product obtained by using ammonia as a specific alkali is essential.

Examples of preferred silicate esters that can be used in this invention are compounds represented by the following formula

$R^1$ represents a member selected from the class consisting of hydrogen and halogen atoms and alkyl groups, $R^2$ represents an alkyl or aryl group, and n represents a number of 0, 1, 2 or 3.

In the above formula, examples of the alkyl group represented by $R^1$ and $R^2$ are alkyl groups having 1 to 4 carbon atoms such as methyl, ethyl, propyl and butyl. Examples of preferred halogen atoms for $R^1$ are chlorine and bromine. A preferred example of the aryl group for $R^2$ is a phenyl group.

Specific examples of the silicate ester of the above formula include tetraalkoxy(or tetraaroxyl)silanes such as tetramethoxysilane, tetraethoxysilane, tetrapropoxysilane, tetrabutoxysilane and tetraphenoxysilane; alkoxyhalosilanes such as trimethoxychlorosilane, triethoxychlorosilane, tripropoxychlorosilane, tributoxychlorosilane, methoxytrichlorosilane, dimethoxydichlorosilane, ethoxytrichlorosilane, diethoxydichlorosilane, trimethoxybromosilane, triethoxybromosilane and ethoxytribromosilane; and alkylalkoxysilanes such as methyltrimethoxysilane, methyltriethoxysilane, methyltributoxysilane, ethyltriethoxysilane, ethyltripropoxysilane, butyltriethoxysilane, dimethyldiethoxysilane, dimethyldibutoxysilane, trimethylmethoxysilane, trimethylethoxysilane, triethylisopropoxysilane and tributylethoxysilane.

The silicate ester can be hydrolyzed, for example, by adding water and ammonia to the ester. The amount of water can be properly selected and changed. It is, for example, about 1 to about 50 moles per mole of the silicate ester. Ammonia may be used in the form of ammonia gas or aqueous ammonia. The amount of ammonia used may also be properly selected and changed. It is, for example, at least 0.1 mole, preferably about 1 to about 10 moles, per mole of the silicate ester.

Hydrolysis of the silicate ester can also be carried out at room temperature, and heating is not particularly necessary. For example, temperatures of about 5° to 100° C. may be employed. Hydrolysis can be carried out also in organic solvents so long as water is present in the hydrolysis system. Examples of suitable organic solvents are lower alcohols such as methanol, ethanol, propanol, butanol and pentanol.

It is presumed that the hydrolyzed product is a product resulting from substituting hydrogen atoms for all or part of $R^2$ groups in the silicate of the above general formula, or an oligomer or polymer thereof.

In the present invention, a copper-containing hydrolyzed product is formed by contacting the resulting hydrolyzed product with the aforesaid aqueous solution of an ammine/copper complex. The hydrolyzed product may be used in the form of the product mixture containing the product as formed by the hydrolysis in contacting it with the aqueous solution of an ammine/copper complex, or in the form of an isolated product from the product mixture. The solid product is usually formed as fine particles by the hydrolysis. As required, the hydrolysis product mixture may be aged, for example, by maintaining it at room temperatue for about 2 to about 200 hours, and the solid product may be collected by using known solid-liquid separating operations such as filtration and decantation. The solid product may, as desired, be dried.

The contacting of the aqueous solution of an ammine/copper complex with the hydrolyzed product may be carried out, for example, by mixing both and as desired, stirring the mixture. The temperature at which the contacting is carried out may, for example, be room temperature to about 100° C.

In the catalyst composition of this invention, there is no particular limitation on the ratio of the supported copper and the carrier (silicon compound). However, as the amount of copper decreases, the catalyst activity of the composition decreases. For this reason, the catalsyt composition preferably contains copper in an amount required for exhibiting sufficient catalytic activity for practical purposes. The preferred amount of copper in terms of the weight ratio of the supported copper to the carrier is from 0.001:1 to 2:1. This ratio can be easily controlled by adjusting the amounts of the copper/ammine complex and the hydrolyzed product of the silicate ester to be mixed.

The product obtained by contacting is subjected, for example, to an evaporating treatment to form a solid residue. As a result, a copper ion is supported on the hydrolyzed product to form a copper-containing material. The solid residue is then washed fully with water and dried. The dried residue is then subjected to a reducing treatment to obtain the catalyst composition of this invention.

Prior to the reducing treatment, the dried residue may be calcined in air at about 300° to about 800° C. for about 1 to about 10 hours. The reducing treatment is a known step, and the catalyst of this invention may be subjectd to the reducing treatment in accordance with known reducing conditions. For example, the reducing treatment may be carried out in a hydrogen stream at a temperature of 100° to 500° C. for a period of 1 to 15 hours.

According to this invention, there is provided a process for producing ethylene glycol which comprises hydrogenating an oxalate diester or a glycolate ester in the vapor phase at an elevated temperature in the presence of a hydrogenation catalyst composed of a reduction product of a copper-containing material formed by contacting an aqueous solution of an ammine/copper complex with a carrier, characterized in that the carrier is a hydrolyzed product obtained by hydrolyzing a silicate ester in the presence of ammonia.

According to the above process carried out in the presence of the catalyst composition of this invention, the many improvements described hereinabove can be achieved, and high conversions and selectivities to the desired compounds and high catalyst strength can be stably retained over long periods of time.

This process is carried out in a customary manner except that the specific catalyst composition of this invention is used. For example, it can be carried out by using the processes disclosed in Japanese Patent Publication No. 42971/1980 (corresponding to U.S. Pat. No. 4,112,245), German Pat. No. 459,603, and Japanese Laid-Open Patent Publication No. 40685/1980.

The starting oxalate diester used in the process of this invention is preferably a di($C_1$–$C_8$)alkyl ester of oxalic acid. Examples include dimethyl oxalate, diethyl oxalate, dibutyl oxalate and diamyl oxalate. The starting glycolate ester used in the process of this invention is preferably a $C_1$–$C_8$ alkyl ester of glycolic acid. Examples include methyl glycolate, ethyl glycolate, propyl glycolate and butyl glycolate.

The reaction conditions in the presence of the catalyst composition of this invention can be properly selected in accordance with known methods. For example, preferred reaction conditions are as follows:

Reaction Temperature

About 140° to about 300° C., preferably about 170° to about 260° C., more preferably about 180° to about 240° C.

Contact Time (Based on STP)

About 0.01 to about 30 seconds (about 0.02 to about 60 g.sec/ml), preferably about 0.2 to about 15 seconds (about 0.4 to about 30 g.sec/ml).

Reaction Pressure

About 0.1 to about 200 atmospheres, preferably about 1 to about 40 atmospheres.

Mole Ratio of Hydrogen to Oxalate Diester or Glycolate Ester

At least about 4, preferably about 10 to about 500, for the oxalate diester. At least about 2, preferably about 10 to about 500, for the glycolate ester.

The catalytic hydrogenation reaction of the oxalate diester can be carried out in any mode by contacting the oxalate diester or the glycolate ester with hydrogen gas and the catalyst composition in the gaseous or vapor phase in a fixed catalyst bed or a fluidized catalyst bed. The reaction can be performed either batchwise or continuously.

The hydrogenating catalyst of the invention does not contain chromium, as is apparent from the method of its preparation. Despite the fact that it does not contain chromium, the catalyst of the invention can efficiently catalyze a reaction of hydrogenating an oxalate diester or a glycolate ester, and the desired product can be obtained in a higher space time yield than in the case of using the known catalysts. Accordingly, the hydrogenating catalyst of this invention is particularly suitable for the industrial production of ethylene glycol from an oxalate diester or a glycolate ester.

The following examples illustrate the invention more specifically.

EXAMPLE 1

With stirring at room temperature, 790 ml of 28 wt. % aqueous ammonia was added to a mixture of 350 g of tetraethoxysilane, 2180 ml of ethanol and 680 ml of water. The slurry containing the resulting white precipitate was stirred for 1 hour, and then left to stand for 2 days. The precipitate (i.e., the hydrolyzate of tetraethoxysilane) was collected by filtration, washed with ethanol several times and then with water, and dried overnight at 120° C.

Separately, a solution of 43.5 g of cupric nitrate trihydrate [$Cu(NO_3)_2 \cdot 3H_2O$] in 100 ml of water and 28 wt. % aqueous ammonia were slowly added dropwise at the same time to 300 ml of water so that the pH of the mixture was kept at 6 to 7. A light-blue precipitate of cupric hydroxide was obtained. The precipitate was fully washed with water, and added to 200 ml of water. The resulting suspension was added to 300 ml of 28 wt. % aqueous ammonia, and then filtered through a glass filter to obtain a deep-blue aqueous solution containing an ammine/copper complex.

Eighty grams (as a dry product) of the hydrolyzate of tetraethoxysilane prepared as above was added to the deep-blue aqueous solution containing the ammine/copper complex, and the mixture was stirred for several hours at room temperature. The temperature was raised, and most of water was evaporated. The residue was dried at 120° C. for 15 hours. The dried product was then fully washed with water, and again dried in air at 140° C. for 14 hours. The dried product was molded into tablets (5 mm in diameter and 5 mm in height) by a tableting machine, calcined in air at 750° C. for 5 hours, subjected to a reducing treatment in a stream of hydrogen at 200° C. for 6 hours to prepare a catalyst containing about 12.5% by weight of copper.

The resulting catalyst was crushed, and 5 ml of catalyst particles having a size of 9 to 16 mesh were collected and filled in a stainless steel reaction tube (inside diameter 10 mm). Diethyl oxalate was catalytically hydrogenated in it at a temperature of 240° C., a pressure of 6 kg/cm$^2$-G, a liquid hourly space velocity (LHSV) of 1.07 g/ml-hr and a space velocity (SV) of 5,900 hr$^{-1}$.

Analysis of the reaction product showed the following results.
Conversion of diethyl oxalate: 100%
Selectivity to ethylene glycol: 91.4%
Selectivity to ethyl glycolate: 4.5%
Yield of 1,2-butanediol: 0.2%

EXAMPLES 2–5

The catalyst prepared in Example 1 was crushed, and 25 ml of catalyst particles having a size of 9 to 16 mesh were collected and filled in a stainless steel reaction tube (inside diameter 20 mm). Dimethyl oxalate was catalytically hydrogenated in it under the reaction conditions shown in Table 1. The results are also shown in Table 1.

TABLE 1

| Example | Reaction conditions | | | | Conversion of dimethyl oxalate (%) | Selectivity to ethylene glycol (%) | Selectivity to methyl glycolate (%) | Yield of 1,2-butanediol (%) |
|---|---|---|---|---|---|---|---|---|
| | Temperature (°C.) | Pressure (kg/cm$^2$-G) | LHSV (g/ml-hr) | SV (hr$^{-1}$) | | | | |
| 2 | 210 | 20 | 0.70 | 6920 | 100 | 91.7 | 1.7 | 0 |
| 3 | 220 | 20 | 0.83 | 7020 | 100 | 95.4 | 0.2 | 0.4 |
| 4 | 220 | 20 | 0.92 | 7000 | 99.9 | 90.4 | 4.7 | 0.1 |
| 5 | 230 | 20 | 1.02 | 6910 | 100 | 94.9 | 1.7 | 0.3 |

EXAMPLE 6

A solution of 75.9 g of cupric nitrate trihydrate in 200 ml of water and 14 wt. % aqueous ammonia were slowly added dropwise at the same time to 300 ml of water with stirring so that the pH of the mixture was kept at 6 to 7. A light-blue precipitate of cupric hydroxide was obtained. The precipitate was fully washed with water, and added little by little to 500 ml of 28 wt. % aqueous ammonia. Furthermore, 500 ml of 28% aqueous ammonia was added, and a deep-blue aqueous solution containing an ammine/copper complex was obtained.

Eighty grams (as a dry product) of the hydrolyzate of tetraethoxysilane obtained by the same operation as in Example 1 was added to the resulting deep-blue aqueous solution containing the ammine/copper complex, and the mixture was stirred at room temperature for several hours. The temperature was then raised to evaporate most of water. The residue was dried at 120° C. for 17 hours. The dried product was washed with 500 ml of 7 wt. % aqueous ammonia, thoroughly washed with water, and dried again in air at 120° C. for 16 hours. The dried product was molded into tablets (5 mm in diameter and 5 mm in height) by a tableting machine, calcined in air at 750° C. for 5 hours, and subjected to a reducing treatment in a stream of hydrogen at 200° C. for 6 hours to prepare a catalyst containing about 16% by weight of copper.

The catalyst so prepared was crushed, and 20 ml of catalyst particles having a size of 9 to 16 mesh were collected and filled in a stainless steel reaction tube (inside diameter 20 mm). Diethyl oxalate was catalytically hydrogenated in it at a temperature of 210° C., a pressure of 6 kg/cm$^2$-G, an LHSV of 0.88 g/ml-hr and an SV of 7,060 hr$^{-1}$.

Analysis of the reaction product showed the folowing results.
Conversion of diethyl oxalate: 100%
Selectivity to ethylene glycol: 92.6%
Selectivity to ethyl glycolate: 4.9%
Yield of 1,2-butanediol: 0.1%

When the reaction was continued under the above reaction conditions for more than 2600 hours, hardly any change was noted in the above results.

EXAMPLE 7

The catalyst prepared in Example 6 was crushed, and 25 ml of catalyst particles having a size of 9 to 16 mesh were collected and filled in a stainless steel reaction tube (inside diameter 20 mm). Dimethyl oxalate was catalytically hydrogenated in it at a temperature of 210° C., a pressure of 20 kg/cm$^2$-G, an LHSV of 0.92 g/ml-hr and an SV of 7,140 hr$^{-1}$.

Analysis of the reaction product showed the following results.
Conversion of dimethyl oxalate: 100%
Selectivity to ethylene glycol: 91.4%
Selectivity to methyl glycolate: 1.7%
Yield of 1,2-butanediol: 0.2%

EXAMPLE 8

To a mixture of 350 g of tetraethoxysilane and 1700 ml of methanol was added 740 ml of 28 wt. % aqueous ammonia cooled to 9° C. at room temperature with stirring. The slurry containing the resulting white precipitate was stirred for 1 hour and then left to stand for 2 days. The precipitate (i.e., the hydrolyzate of tetraethoxysilane) was collected by filtration, washed with methanol several times and then with water, and dried overnight at about 120° C.

Separately, a solution of 24.5 g of cupric nitrate trihydrate in 128 ml of water and 14 wt. % aqueous ammonia were added slowly dropwise at the same time to 168 ml of water with stirring so that the pH of the resulting mixture was kept at 6 to 7. A light-blue precipitate of cupric hydroxide was obtained. The precipitate was washed fully with water, and added to 315 ml of 28 wt. % aqueous ammonia. Then, 145 ml of water was added, and the mixture was filtered through a glass filter to obtain a deep-blue aqueous solution containing an ammine/copper complex.

To the deep-blue aqueous solution containing the ammine/copper complex was added 45 g (as a dry product) of the hydrolyzate of tetraethoxysilane prepared as above, and the mixture was stirred at room temperature for several hours. The temperature was then raised to evaporate most of water, and the residue was dried overnight at 120° C. The dried product was fully washed with water, and again dried in air at 120° C. for 14 hours. The dried product was molded into tablets (5 mm in diameter and 5 mm in height) by a tableting machine, calcined in air at 750° C. for 5 hours, and subjected to a reducing treatment in a stream of hydrogen at 200° C. for 6 hours to prepare a catalyst containing about 12.5% by weight of copper.

The resulting catalyst was crushed, and 5 ml of catalyst particles having a size of 9 to 16 mesh were collected and filled in a stainless steel reaction tube (inside diameter 10 mm). Diethyl oxalate was catalytically hydrogenated in it at a temperature of 220° C., a pressure of 6 kg/cm$^2$-G, an LHSV of 1.05 g/ml-hr and an SV of 8,160 hr$^{-1}$.

Analysis of the reaction product showed the following results.
Conversion of diethyl oxalate: 100%
Selectivity to ethylene glycol: 94.1%
Selectivity to ethyl glycolate: 2.0%
Yield of 1,2-butanediol: 0.2%

EXAMPLE 9

The hydrolyzate of tetramethoxysilane was prepared by the same operation as in Example 8 except that 261 g of tetramethoxysilane was used as the silicate ester.

Separately, a solution of 35.2 g of cupric nitrate trihydrate in 156 ml of water and 106 ml of 28 wt. % aqueous ammonia were mixed with stirring to obtain a deep-blue aqueous solution containing an ammine/copper complex.

A catalyst containing about 16% by weight of copper was prepared by the same operation as in Example 8 except that the deep-blue aqueous solution containing the ammine/copper complex and 45 g of the hydrolyzate of tetramethoxysilane (dried product) were used.

The resulting catalyst was crushed, and 5 ml of catalyst particles having a size of 9 to 16 mesh were collected and filled in a stainless steel reaction tube (inside diameter 10 mm). Diethyl oxalate was catalytically hydrogenated in it at a temperature of 210° C., a pressure of 6 kg/cm$^2$-G, an LHSV of 1.05 g/ml-hr and an SV of 8,125 hr$^{-1}$.

Analysis of the reaction product showed the following results.
Conversion of diethyl oxalate: 100%
Selectivity to ethylene glycol: 94.4%
Selectivity to ethyl glycolate: 0.6%
Yield of 1,2-butanediol: 0.2%

EXAMPLE 10

The hydrolyzate of tetra-n-propoxysilane was prepared by the same operation as in Example 8 except that 444 g of tetra-n-propoxysilane was used as the silicate ester.

Separately, a solution of 73.3 g of cupric nitrate trihydrate in 270 ml of water and 220 ml of 28 wt. % aqueous ammonia were mixed with stirring to obtain a deep-blue aqueous solution containing an ammine/copper complex.

A catalyst containing about 20% by weight of copper was prepared by the same operation as in Example 8 except that the deep-blue aqueous solution containing the ammine/copper complex and 45 g of the hydrolyzate of tetra-n-propoxysilane (dried product) prepared as above were used.

Diethyl oxalate was catalytically hydrogenated under the same reaction conditions as in Example 9 except that the catalyst prepared above was used.

Analysis of the reaction product showed the following results.
Conversion of diethyl oxalate: 100%
Selectivity to ethylene glycol: 94.8%
Selectivity to ethyl glycolate: 1.4%
Yield of 1,2-butanediol: 0.9%

EXAMPLE 11

To a mixture of 3.5 kg of tetraethoxysilane and 17 liters of methanol was added 7.4 liters of 28 wt. % aqueous ammonia cooled to 11° C. at room temperature with stirring. The slurry containing the resulting white precipitate was stirred for 1 hour and then left to stand for 3 days. The precipitate (i.e., the hydrolyzate of tetraethoxysilane) was collected by filtration, washed with methanol several times and then with water, and dried at 120° C. for 1 day.

Separately, 590 ml of 28 wt. % aqueous ammonia was added with stirring to a solution of 195 g of cupric nitrate trihydrate in 870 ml of water to form a deep-blue aqueous solution containing an ammine/copper complex.

To the deep-blue aqueous solution containing the ammine/copper complex was added 250 g (as a dry product) of the hydrolyzate of tetraethoxysilane prepared as above, and the mixture was stirred at room temperature for several hours. The temperature was then raised to evaporate most of water, and the residue was dried overnight at 120° C. The dried product was fully washed with water, and again dried in air at about 120° C. for 1 day. The dried product was molded into tablets (5 mm in diameter and 5 mm in height) by a tableting machine, calcined in air at 750° C. for 5 hours, and subjected to a reducing treatment in a stream of hydrogen at 200° C. for 6 hours to prepare a catalyst containing about 17% by weight of copper.

Diethyl oxalate was catalytically hydrogenated under the same reaction conditions as in Example 9 except that the catalyst obtained was used.

Analysis of the reaction product showed the following results.

Conversion of diethyl oxalate: 100%
Selectivity to ethylene glycol: 94.4%
Selectivity to ethyl glycolate: 0.8%
Yield of 1,2-butanediol: 0.4%

EXAMPLE 12

To a mixture of 350 g of tetraethoxysilane, 1700 ml of methanol and 450 ml of water was added 290 ml of 28 wt. % aqueous ammonia at room temperature with stirring. The slurry containing the resulting white precipitate (i.e., the hydrolyzate of tetraethoxysilane) was stirred for 1 hour, and then left to stand for several days.

Separately, a solution of 95.1 g of cupric nitrate trihydrate in 250 ml of water and 285 ml of 28 wt. % aqueous ammonia were mixed with stirring to obtain a deep-blue aqueous solution containing an ammine/copper complex.

The resulting deep-blue aqueous solution containing the ammine/copper complex was added to the slurry containing the hydrolyzate of tetraethoxysilane prepared as above, and the mixture was stirred at room temperature for several hours. The temperature was then raised to evaporate most of methanol and water, and the residue was dried overnight at 120° C. The dried product was fully washed with water, and again dried overnight in air at 120° C. The dried product was molded into tablets (5 mm in diameter and 5 mm in height) by a tableting machine, calcined in air at 750° C. for 5 hours, and then subjected to a reducing treatment in a stream of hydrogen at 200° C. for 6 hours to prepare a catalyst containing about 19.5% by weight of copper.

Diethyl oxalate was catalytically hydrogenated under the same reaction conditions as in Example 9 except that the resulting catalyst was used.

Analysis of the reaction product showed the following results.

Conversion of diethyl oxalate: 100%
Selectivity to ethylene glycol: 93.2%
Selectivity to ethyl glycolate: 3.9%
Yield of 1,2-butanediol: 0.5%

EXAMPLE 13

To a mixture of 350 g of tetraethoxysilane and 1020 ml of water was added 200 ml of 28 wt. % aqueous ammonia at room temperature with stirring. The mixture was stirred until it was almost uniformly emulsified. The suspension was then left to stand for several days. An aqueous solution containing an ammine/copper complex prepared by the same operation as in Example 12 was added to the resulting suspension containing the hydrolyzate of tetraethoxysilane. The mixture was then worked up by the same operation as in Example 12 to prepare a catalyst containing about 19.5% by weight of copper.

Diethyl oxalate was catalytically hydrogenated under the same reaction conditions as in Example 9 except that the resulting catalyst was used. Analysis of the reaction product showed the following results.

Conversion of diethyl oxalate: 100%
Selectivity to ethylene glycol: 92.3%
Selectivity to ethyl glycolate: 1.9%
Yield of 1,2-butanediol: 1.0%

EXAMPLE 14

A catalyst containing about 12.5% by weight of copper was prepared in the same way as in Example 8 except that 251 g of an oligomer of Ethyl Silicate 40 (a trade name for a product of Colcoat Co. Ltd.) was used as the silicate ester.

Diethyl oxalate was catalytically hydrogenated under the same reaction conditions as in Example 9 except that the resulting catalyst was used.

Analysis of the reaction product showed the following results.

Conversion of diethyl oxalate: 100%
Selectivity to ethylene glycol: 93.2%
Selectivity to ethyl glycolate: 1.2%
Yield of 1,2-butanediol: 1.1%

COMPARATIVE EXAMPLE 1

Diethyl oxalate was catalytically hydrogenated under the same reaction conditions as in Example 9 except that 20 ml of catalyst particles having size of 9 to 16 mesh obtained by pulverizing commercial copper-chromium-manganese catalyst (N201, a product of Nikki Kagaku K. K.; tablets having a diameter of 5 mm and a height of 5 mm) were used.

Analysis of the reaction product showed the following results.

Conversion of diethyl oxalate: 91.0%
Selectivity to ethylene glycol: 72.3%
Selectivity to ethyl glycolate: 12.4%
Yield of 1,2-butanediol: 2.5%

The reaction was continued under these reaction conditions, and after the lapse of about 50 hours, the reaction product was analyzed. The results were as follows:

Conversion of diethyl oxalate: 88%
Selectivity to ethylene glycol: 64%
Selectivity to ethyl glycolate: 25%

EXAMPLE 15

The catalyst prepared in Example 11 was crushed, and 5 ml of catalyst particles having a size of 9 to 16 mesh were collected and filled in a stainless steel reaction tube (inside diameter 10 mm, length 130 mm). Ethyl glycolate was catalytically hydrogenated in it at a temperature of 200° C., a pressure of 6 kg/cm$^2$-G and an SV of 23,000 hr$^{-1}$ while maintaining the mole ratio of hydrogen to ethyl glycolate at 97.5.

Analysis of the reaction product showed the following results.

Conversion of ethyl glycolate: 100%
Selectivity to ethylene glycol: 99.5%
1,2-Butanediol: not detected

EXAMPLE 16

With stirring at room temperature, 790 ml of 28 wt. % aqueous ammonia was added to a mixture of 350 g of tetraethoxysilane, 2180 ml of ethanol and 680 ml of water. The slurry containing the resulting white precipitate was stirred for 1 hour, and then left to stand for 2 days. The precipitate (i.e., the hydrolyzate of tetraethoxysilane) was collected by filtration, washed with ethanol several times and then with water, and dried overnight at 120° C.

Separately, a solution of 75.9 g of cupric nitrate trihydrate in 200 ml of water and 14 wt. % aqueous ammonia were slowly added dropwise at the same time to 300 ml of water with stirring so that the pH of the mixture was kept at 6 to 7. A light-blue precipitate of cupric hydroxide was obtained. The precipitate was fully washed with water, and added little by little to 500 ml of 28 wt. % aqueous ammonia. Furthermore, 500 ml of 28% aqueous ammonia was added, and a deep-blue aqueous solution containing an ammine/copper complex was obtained.

Eighty grams (as a dry product) of the hydrolyzate of tetraethoxysilane obtained by the same operation as in Example 1 was added to the resulting deep-blue aqueous solution containing the ammine/copper complex, and the mixture was stirred at room temperature for several hours. The temperature was then raised to evaporate most of water. The residue was further dried at 120° C. for 17 hours. The dried product was washed with 500 ml of 7 wt. % aqueous ammonia, thoroughly washed with water, and dried again in air at 120° C. for 16 hours. The dried product was molded into tablets (5 mm in diameter and 5 mm in height) by a tableting machine, calcined in air at 750° C. for 5 hours, and subjected to a reducing treatment in a stream of hydrogen at 200° C. for 6 hours to prepare a catalyst containing about 16% by weight of copper.

The catalyst so prepared was crushed, and 5 ml of catalyst particles having a size of 9 to 16 mesh were collected and filled in a stainless steel reaction tube (inside diameter 10 mm, length 130 mm). Ethyl glycolate was catalytically hydrogenated in it at a temperature of 200° C., a pressure of 6 kg/cm$^2$-G and an SV of 20,600 hr$^{-1}$ while maintaining the mole ratio of hydrogen to ethyl glycolate at 102.

Analysis of the reaction product showed that the conversion of ethyl glycolate was 100%, and the selectivity to ethylene glycol was 98.4%. No 1,2-butanediol was detected.

EXAMPLES 17–18

The catalyst prepared in Example 8 was crushed, and 5 ml of catalyst particles having a size of 9 to 16 mesh were collected and filled in a stainless steel reaction tube (inside diameter 10 mm, length 130 mm). Ethyl glycolate was catalytically hydrogenated in it at a temperature of 210° C. (Example 17) or 220° C. (Example 18), a pressure of 6 kg/cm$^2$-G and an SV of about 20,000 hr$^{-1}$ while maintaining the mole ratio of hydrogen to ethyl glycolate at about 100. The results are shown in Table 2.

TABLE 2

| Example | Reaction temperature (°C.) | Conversion of ethyl glycolate (%) | Selectivity to ethylene glycol (%) | Yield of 1,2-butanediol (%) |
|---|---|---|---|---|
| 17 | 210 | 99.8 | 95.2 | 0.02 |
| 18 | 220 | 100 | 97.1 | 0.33 |

EXAMPLE 19

The catalyst prepared in Example 9 was crushed, and 5 ml of catalyst particles having a size of 9 to 16 mesh were collected and filled in a stainless steel reaction tube (inside diameter 10 mm, length 130 mm). Ethyl glycolate was catalytically hydrogenated in it at a temperature of 200° C., a pressure of 6 kg/cm$^2$-G and an SV of 23,400 hr$^{-1}$ while maintaining the mole ratio of hydrogen to ethyl glycolate at 113.

Analysis of the reaction product showed that the conversion of ethyl glycolate was 100% and the selectivity to ethylene glycol was 96.5%. No 1,2-butanediol was detected.

EXAMPLE 20

Ethyl glycolate was catalytically hydrogenated under the same conditions as in Example 19 except that the catalyst prepared in Example 10 was used. Analysis of the reaction product showed that the conversion of ethyl glycolate was 100%, the selectivity to ethylene glycol was 95.5%, and the yield of 1,2-butanediol was 0.15%.

EXAMPLE 21

The catalyst prepared in Example 14 was crushed, and 5 ml of catalyst particles having a size of 9 to 16 mesh were collected and filled in a stainless steel reaction tube (inside diameter 10 mm, length 130 mm). Ethyl glycolate was catalytically hydrogenated in it at a temperature of 210° C., a pressure of 6 kg/cm$^2$-G and an SV of 22,200 hr$^{-1}$ while maintaining the mole ratio of hydrogen to ethyl glycolate at 108.

Analysis of the reaction product showed that the conversion of ethyl glycolate was 99.1, the selectivity to ethylene glycol was 97.4%, and the yield of 1,2-butanediol was 0.3%.

EXAMPLE 22

To a mixture of 350 g of tetraethoxysilane, 1700 ml of methanol and 450 ml of water was added 290 ml of 28 wt. % aqeuous ammonia cooled to 9°–10° C. with stirring at room temperature. The slurry containing the resulting white precipitate (i.e., the hydrolyzate of tetraethoxysilane) was stirred for 1 hour, and left to stand for several days.

Separately, a solution of 95.1 g of cupric nitrate trihydrate in 250 ml of water and 285 ml of 28 wt. % aqueous ammonia were mixed with stirring to obtain a deep-blue aqueous solution containing an ammine/copper complex.

The resulting deep-blue aqueous solution containing the ammine/copper complex was added to the slurry of the hydrolyzate of tetraethoxysilane prepared as above, and the mixture was stirred at room temperature for several hours. The temperature was raised to evaporate most of methanol and water, and the residue was dried overnight at 120° C. The dried product was washed fully with water, and again dried overnight at 120° C. in air. The dried product was molded into tablets (5 mm in diameter and 5 mm in height) by a tableting machine, calcined in air at 750° C. for 5 hours, and subjected to a reducing treatment in a hydrogen stream at 200° C. for 6 hours to prepare a catalyst containing about 19.5% of copper.

Diethyl oxalate was catalytically hydrogenated under the same conditions as in Example 16 except that the catalyst so prepared was used.

Analysis of the reaction product showed that the conversion of ethyl glycolate was 99.7% and the selectivity to ethylene glycol was 96.0%. No 1,2-butanediol was detected.

EXAMPLES 23-24

The catalyst prepared in Example 13 was crushed, and 5 ml of catalyst particles having a size of 9 to 16 mesh were collected and filled in a stainless steel reaction tube (inside diameter 10 mm, length 130 mm). Ethyl glycolate was catalytically hydrogenated in it at a temperature of 190° C. (Example 23) or 200° C. (Example 24), a pressure of 6 kg/cm²-G and an SV of about 20,600 hr$^{-1}$ while maintaining the mole ratio of hydrogen to ethyl glycolate at about 101.

The results are shown in Table 3.

COMPARATIVE EXAMPLES 2-3

24.2 g of cupric nitrate trihydrate was dissolved in 220 ml of water, and the solution was mixed with a solution of 29.7 g of zinc nitrate hexahydrate in 270 ml of water. Then, the solution was further mixed with a solution of 45.6 g of ammonium chromate in 140 ml of water to obtain a light-brown precipitate. Ammonia was added to the slurry to adjust its pH to 7. It was then stirred for 1 to 2 hours to age it, and then filtered. The filtrate was dried at 120° C. for 15 hours. The dried product was put little by little in a vessel kept at about 400° C. to decompose it thermally. At this time, the catalyst turned from light-brown to black. The blackened catalyst was subjected to a reducing treatment with hydrogen at 200° C. for 5 hours to obtain a copper-chromium-zinc catalyst.

Using 5 ml of this catalyst, ethyl glycolate was catalytically hydrogenated under the same conditions as in Examples 23 and 24. The results are shown in Table 3.

TABLE 3

| Example (Ex.) or Comparative Example (Comp. Ex.) | Reaction temperature (°C.) | Conversion of ethyl glycolate (%) | Selectivity to ethylene glycol (%) | Yield of 1,2-butanediol (%) |
|---|---|---|---|---|
| Ex. 23 | 190 | 98.6 | 98.8 | trace |
| Ex. 24 | 200 | 100 | 99.2 | trace |
| Comp. Ex. 2 | 190 | 88.5 | 84.3 | 1.6 |
| Comp. Ex. 3 | 200 | 98.0 | 84.6 | 2.2 |

What is claimed is:

1. A hydrogenation catalyst composition composed of a reduction product of a copper-containing material formed by contacting an aqueous solution of ammine/copper complex with a carrier, characterized in that the carrier is a hydrolyzed product obtained by hydrolyzing silicate ester in the presence of ammonia, and subjecting the resulting copper-containing hydrolyzed product to a reducing treatment.

2. The composition of claim 1 wherein the silicate ester is a compound represented by the following formula $$R_n^1Si(OR^2)_{4-n}$$

wherein $R^1$ represents a member selected from the class consisting of hydrogen and halogen atoms and alkyl groups, $R^2$ represents an alkyl or aryl group, and n represents a number of 0, 1, 2 or 3.

3. The composition of claim 1 wherein the weight ratio of Cu to the carrier is from 0.001:1 to 2:1.

4. A process for producing a hydrogenation catalyst for use in the hydrogenation of an oxalate diester or a glycolate ester, which comprises contacting an aqueous solution of an ammine/copper complex with a hydrolyzed product obtained by hydrolyzing a silicate ester in the presence of ammonia, and subjecting the resulting copper-containing hydrolyzed product to a reducing treatment.

5. The process of claim 4 wherein the silicate ester is a compound represented by the following formula $$R_n^1Si(OR^2)_{4-n}$$

wherein $R^1$ represents a member selected from the class consisting of hydrogen and halogen atoms and alkyl groups, $R^2$ represents an alkyl or aryl group, and n represents a number of 0, 1, 2 or 3.

6. The process of claim 4 wherein the contacting is carried out at room temperature to about 100° C.

7. The process of claim 4 wherein the reducing treatment is carried out in the presence of hydrogen at a temperature of about 100° to about 500° C.

8. The composition of claim 2 wherein $R_1$ and $R_2$ of the silicate ester are alkyl groups having one to four carbon atoms.

9. The composition of claim 2 wherein $R_1$ of the silicate ester represents chlorine or bromine.

10. The composition of claim 2 wherein $R_2$ of the silicate ester is a phenyl group.

11. The process of claim 5 wherein $R_1$ and $R_2$ of the silicate ester are alkyl groups having one to four carbon atoms.

12. The process of claim 5 wherein $R_1$ of the silicate ester represents chlorine or bromine.

13. The process of claim 5 wherein $R_2$ of the silicate ester is a phenyl group.

14. The catalyst of claim 1 wherein the silicate ester is selected from the group consisting of tetraalkoxysilanes, tetraaroxylsilanes, alkoxyhalosilanes and alkylalkoxysilanes.

15. The catalyst of claim 4 wherein the silicate ester is selected from the group consisting of tetraalkoxysilanes, tetraaroxylsilanes, alkoxyhalosilanes and alkylalkoxysilanes.

16. The process of claim 4 wherein the amount of ammonia is as least 0.1 mole per mole of the silicate ester.

* * * * *